United States Patent
Huang

(10) Patent No.: US 8,732,131 B2
(45) Date of Patent: May 20, 2014

(54) PROCESSING SYSTEM CAPABLE OF PERFORMING DOWNLOAD AND EXECUTION PROCESSES CONCURRENTLY AND RELATED METHOD THEREOF

(75) Inventor: Tau-Li Huang, Hsin-Chu (TW)

(73) Assignee: MediaTek Inc., Science-Based Industrial Park, Hsin-Chu Hsien (TW)

(*) Notice: Subject to any disclaimer, the term of this patent is extended or adjusted under 35 U.S.C. 154(b) by 1709 days.

(21) Appl. No.: 11/307,661

(22) Filed: Feb. 16, 2006

(65) Prior Publication Data

US 2007/0192430 A1 Aug. 16, 2007

(51) Int. Cl.
*G06F 17/30* (2006.01)

(52) U.S. Cl.
USPC ........... 707/661; 707/308; 707/640; 707/673; 707/705; 707/813

(58) Field of Classification Search
USPC .................. 707/608, 640, 661, 673, 705, 813
See application file for complete search history.

(56) References Cited

U.S. PATENT DOCUMENTS

| | | | |
|---|---|---|---|
| 2005/0144611 A1* | 6/2005 | Chen et al. | 717/168 |
| 2005/0273589 A1 | 12/2005 | Gong | |

* cited by examiner

*Primary Examiner* — Sana Al Hashemi
(74) *Attorney, Agent, or Firm* — Winston Hsu; Scott Margo

(57) ABSTRACT

A processing system capable of downloading and executing firmware at the same time, and from multiple storages, is disclosed. The processing system includes a first storage unit for storing firmware; a second storage unit for storing frequently accessed firmware, the second storage unit having a higher operating speed than the first storage unit; a download unit for downloading firmware from the first storage unit to the second storage unit; an execution unit for executing firmware from the first storage unit or the second storage unit; and a processor for controlling the download unit and execution unit to operate concurrently.

17 Claims, 4 Drawing Sheets

PROCESSING SYSTEM CAPABLE OF PERFORMING DOWNLOAD AND EXECUTION PROCESSES CONCURRENTLY AND RELATED METHOD THEREOF

BACKGROUND

As computer technology develops, the speed of processors also increases. Many modern processors utilize a parallel FLASH memory, which has a relatively high operating speed but requires many pins for the necessary connections, thereby increasing the cost of the processing unit design. Serial FLASH needs very few pins to transmit the data in some kind of serial form, but with a lower bandwidth compared to that of a parallel FLASH. Conventional processors download the whole firmware from the serial flash to a DRAM before the system starts up. However, large firmware will require a large DRAM space. Lowering the cost and complexity of the processing unit while maintaining a fast operational speed therefore becomes an important issue for the manufacturers.

SUMMARY

It is therefore one of the objectives of the present invention to provide a processing system that utilizes a serial FLASH memory, while maintaining a high operational speed.

To achieve this aim, the processing system includes a download unit and an execution unit that can be operated by a processor concurrently.

Briefly described, the processing system comprises: a first storage unit for storing firmware; a second storage unit for storing frequently accessed firmware; a download unit for downloading firmware from the first storage unit to the second storage unit; an execution unit for executing firmware from the first storage unit or the second storage unit; and a processor for controlling the download unit and execution unit to operate concurrently.

A method is also disclosed for downloading and executing firmware, the method comprising: storing firmware in a first storage unit; downloading firmware from the first storage unit to a second storage unit; selectively executing firmware from the second storage unit or executing firmware from the first storage unit; and controlling the download process and the execution process to operate concurrently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
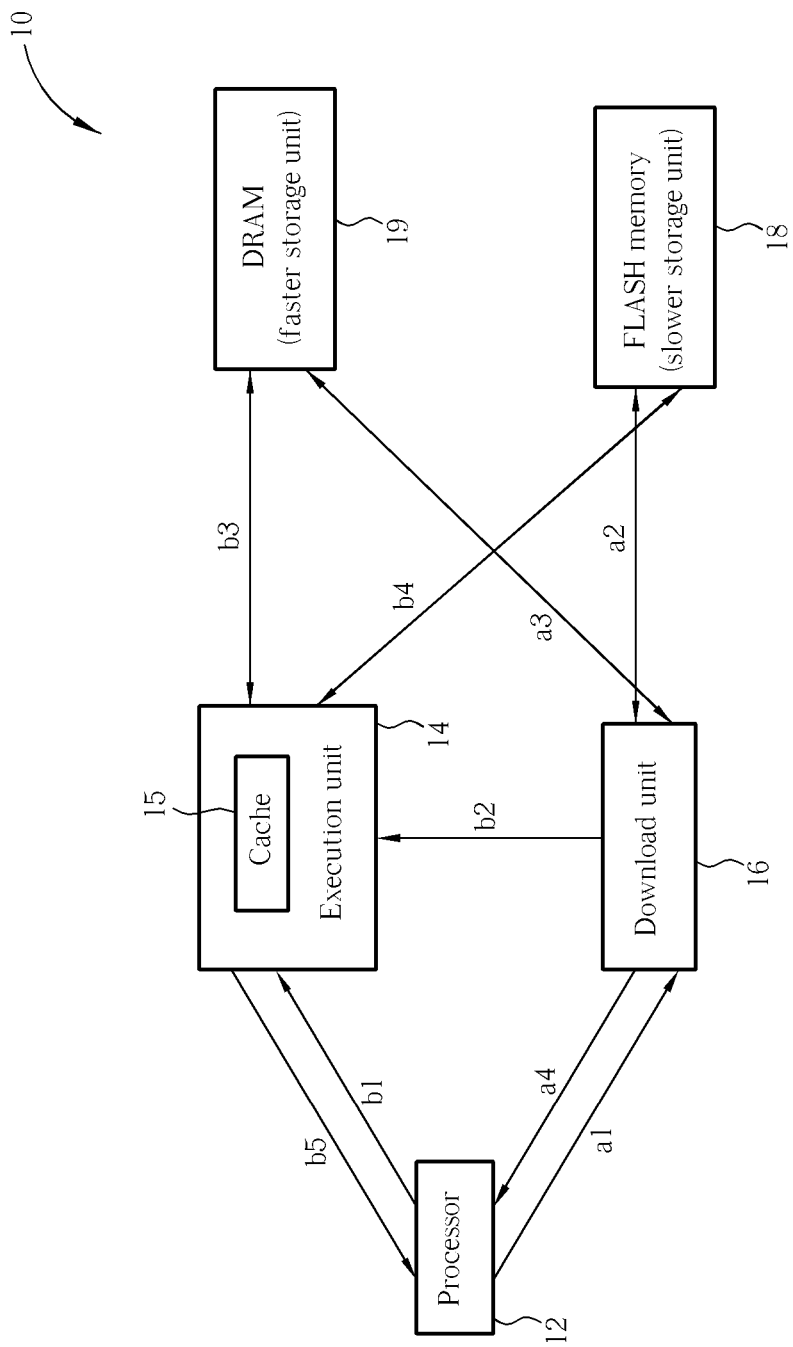
FIG. 1 is a diagram of a processing system according to a first embodiment of the present invention.

Please refer to FIG. 1. FIG. 1 is a diagram of a processing system 10 according to a first embodiment of the present invention. The processing system 10 comprises a processor 12; an execution unit 14, further comprising a cache 15; a download unit 16; a first storage unit 18; and a second storage unit 19 having a faster access speed than the first storage unit 18. In this embodiment the first storage unit 18 is implemented by a serial FLASH memory, and the second storage unit 19 is implemented by a DRAM. Please note this is merely an embodiment of the present invention, and other kinds of memories can be utilized. For example, in other embodiments, the second storage unit 19 is implemented by an SRAM instead of a DRAM. The serial FLASH memory 18 contains all of the firmware required by the processor 12, whereas firmware frequently executed by the processor 12 will be downloaded to the faster DRAM 19. The download process will be described herein, with reference to the path numerals detailed in FIG. 1. Initially the processor 12 sends a download request, containing an address of required firmware, to the download unit 16 (path a1). The download unit 16 reads the requested firmware from the serial FLASH 18 (path a2) and writes it to the DRAM 19 (path a3), then sends a notification signal to the processor 12 once the download process is complete (path a4).

The execution process will now be detailed. The processor 12 sends an address of required firmware to the execution unit 14 (path b1), which then searches the download unit 16 to determine if the requested firmware is located in the FLASH 18 or the DRAM 19 (path b2). Once the location is determined, the execution unit 14 sets an instruction path to the storage unit containing the requested firmware, fetches the desired firmware and writes it to the cache 15 (paths b3/b4). The processor 12 then fetches the instructions buffered in the cache 15 of the execution unit 14 (path b5).

The utilization of a separate execution unit 14 and download unit 16 allows the processor 12 to control these units to operate concurrently. The separation of the download unit 16 and execution unit 14 means separate, independent download and execution paths exist in the processing system 10. As the units can work at the same time, firmware can be downloaded from the first storage unit 18 to the second storage unit 19 by the download unit 16 at the same time as other firmware is executed by the execution unit 14. The execution unit 14 can access either storage unit by switching an instruction path to the storage units, according to information supplied by the download unit 16, and the download process can be carried out at the same time.

Figure 2:
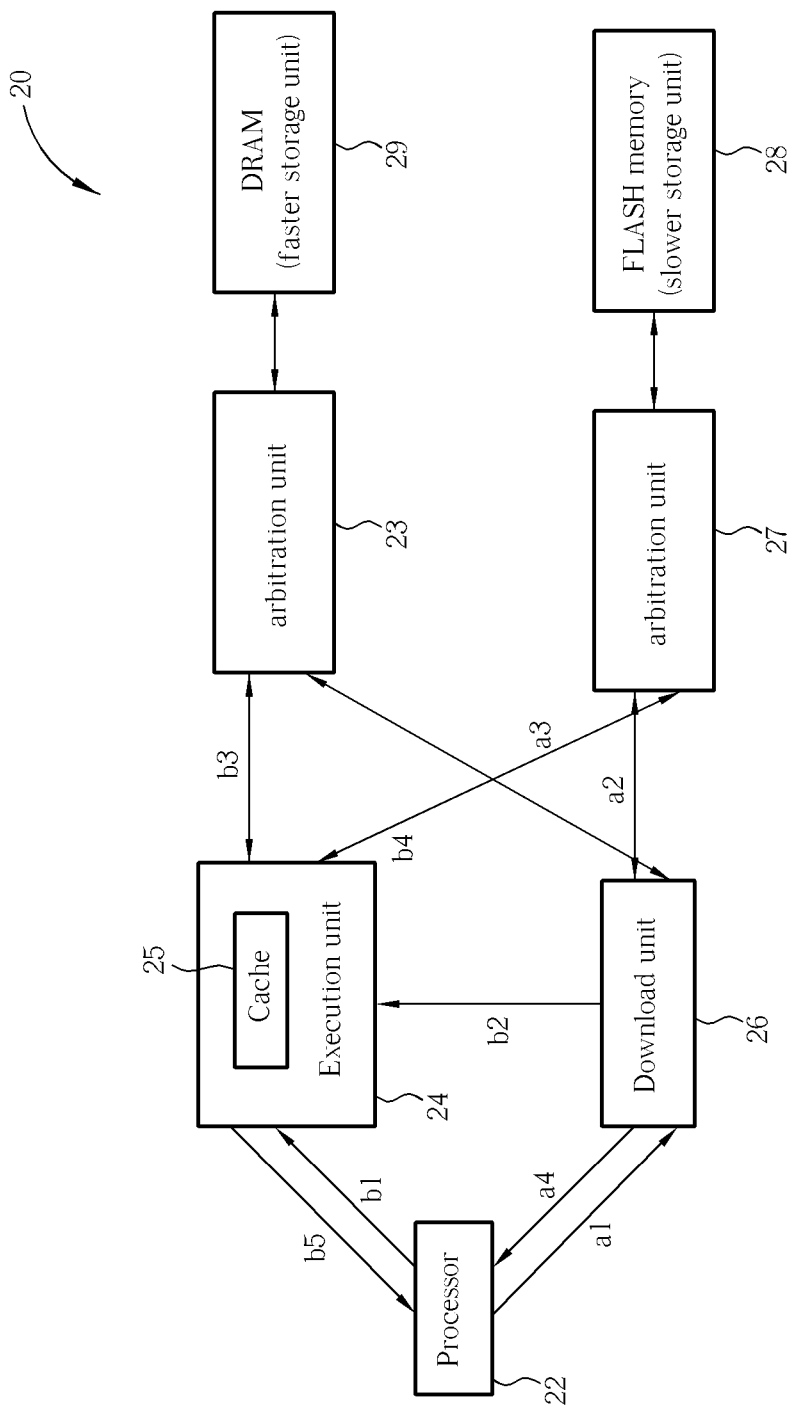
FIG. 2 is a diagram of a processing system according to a second embodiment of the present invention.

In an event where the execution unit 14 and the download unit 16 wish to access the same storage unit simultaneously, the present invention discloses using arbitration units, connected to each storage unit, for buffering read and write requests. Please refer to FIG. 2. FIG. 2 is a diagram of a processing system 20 according to a second embodiment of the present invention. The configuration of the processing system 20 shown in FIG. 2 is similar to that of the processing system 10 shown in FIG. 1. The key difference is that the second embodiment contains two arbitration units 23, 27 connected between the second storage unit (i.e. the DRAM) 29 and the execution unit 24, and the first storage unit (i.e. the FLASH memory) 28 and the download unit 26 respectively. In this embodiment the arbitration units 23, 27 are implemented by buffers. It should be noted that the components of the same name have the same functionality and operation, and further description is therefore omitted for brevity. The processor 22 may send many download and execution commands at the same time. The arbitration units 23, 27 can prioritize the commands by buffering all commands and sending them to the DRAM 29 and FLASH 28 respectively, according to a queue dictated by the processor 22. Please note that although buffers are utilized as the arbitration units in this embodiment, any storage units that fulfill the function of organizing read and write requests into a priority queue can be utilized. That is, other circuits could be utilized to achieve the same objective of arbitrating access of a target storage unit.

Figure 3:
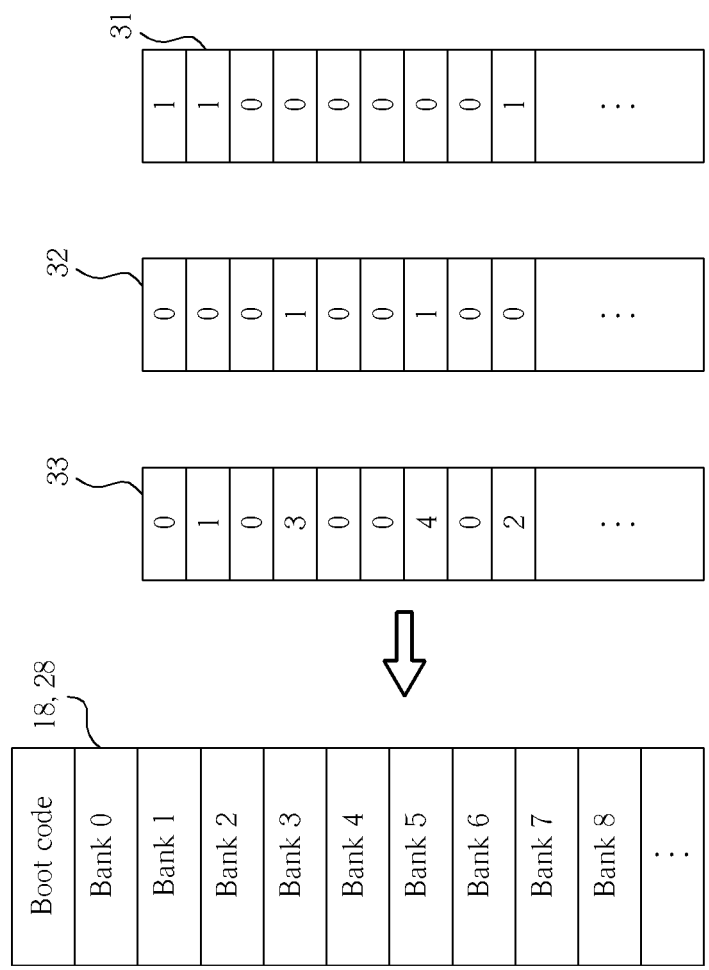
FIG. 3 is a first diagram of look-up tables utilized for assigning memory space to downloaded firmware.
Figure 4:
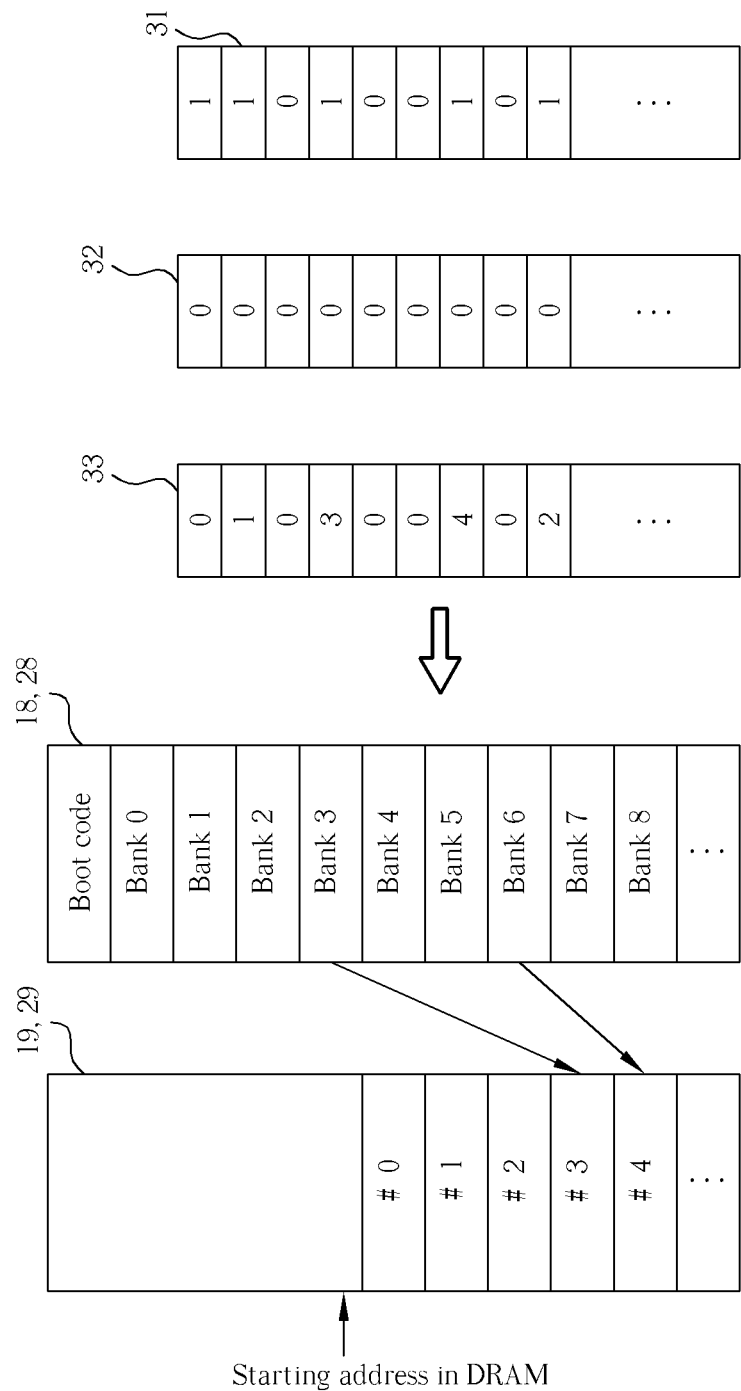
FIG. 4 is a second diagram of look-up tables utilized for assigning memory space to downloaded firmware.

To further increase the capacity of the above processing systems 10, 20, discontinuous firmware, i.e. randomly stored firmware, downloaded from the serial FLASH memory 18, 28 to the DRAM 28, 29 will be stored in the DRAM 28, 29 in continuous space. Please refer to FIG. 3. FIG. 3 is a diagram of look-up tables utilized for assigning memory space to downloaded firmware. The processing system 10, 20 maintains three look-up tables (LUTs) in the download unit 16, 26; an access map 31, a download map 32, and an address index table 33. The access map 31 indicates which banks in the serial FLASH memory 18, 28 have been downloaded to the DRAM 19, 29. Please note that a boot code is commonly stored in the beginning of the FLASH memory 18, 28. In this embodiment, occupied banks are assigned a '1' and unoccupied banks are assigned a '0'. The download map 32 indicates which banks in the FLASH memory 18, 28 are waiting to be downloaded to the DRAM 19, 29, by assigning said banks a '1'. In FIG. 3, it can be seen that bank 3 and bank 6 of the FLASH memory 18, 28 will be downloaded. As these banks are discontinuous they would conventionally be stored in discontinuous addresses. The present invention utilizes the address index table 33 to assign them to continuous DRAM space. The download unit 16, 26 compares the address index table 33 with the access map 31. As can be seen from FIG. 3, firmware from the serial FLASH memory 18, 28 has already been downloaded to banks 0, 1 and 2 in the DRAM 19, 29, so the two units to be downloaded are assigned to bank addresses 3 and 4 respectively. After the firmware has been downloaded to the DRAM 19, 29, the access map 31 will be updated by assigning the downloaded banks in the FLASH memory 18, 28 with a '1'. As shown in FIG. 4, the access map 31 and the download map 32 have been updated accordingly.

Please note that the utilization of two storage units is simply an embodiment of the present invention and should not be taken as a limitation. More than one execution unit and download unit respectively can be utilized in the claimed processing system, and more than two storage units may also be utilized. These changes still obey the spirit of the present invention.

Please note that the above description utilizes a serial FLASH and a DRAM to illustrate the working of the claimed processing system. These storage units, however, are merely illustrations of the claimed invention and should not be taken as limitations. Any combination of storages may be utilized; these changes also obey the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing system for executing programs, the processing system comprising:
   a first storage unit, storing a plurality of predetermined programs;
   a second storage unit;
   a download unit, coupled to the first storage unit and the second storage unit, for downloading at least a predetermined program of the plurality of predetermined programs from the first storage unit to the second storage unit;
   an execution unit, coupled to the download unit, the first storage unit and the second storage unit, for selectively executing the predetermined program in the second storage unit or predetermined programs in the first storage unit; and
   a processor, coupled to the download unit and the execution unit, for controlling the download unit and the execution unit to operate concurrently.

2. A method for executing programs, comprising:
   (a) storing a plurality of predetermined programs utilizing a first storage unit;
   (b) downloading at least a predetermined program of the plurality of predetermined programs from the first storage unit to a second storage unit;
   (c) selectively executing the predetermined program in the second storage unit or predetermined programs in the first storage unit; and
   (d) controlling step (b) and step (c) to operate concurrently.

3. The processing system of claim 1, wherein the first storage unit is a non-volatile memory.

4. The processing system of claim 1, wherein the second storage unit is a volatile memory.

5. The processing system of claim 1, further comprising:
   a first arbitration unit, coupled to the first storage unit, the download unit and the execution unit, for arbitrating commands for programs from the download unit and the execution unit; and
   a second arbitration unit, coupled to the second storage unit, the download unit and the execution unit, for arbitrating commands for programs from the download unit and the execution unit.

6. The processing system of claim 1, wherein the execution unit comprises a cache, for storing programs from the first storage unit and the second storage unit requested by the processor.

7. The processing system of claim 1, wherein the predetermined programs are firmware of an optical disc drive.

8. The processing system of claim 1, being disposed in an optical disc drive.

9. The processing system of claim 1, wherein the first storage unit includes a plurality of storage areas, the download unit has a first look-up table for determining which storage areas in the first storage unit are to be downloaded to the second storage unit, a second look-up table for assigning addresses of the second storage unit to storage areas of the first storage unit to be downloaded to the second storage unit, a third look-up table for determining which storage areas of the first storage unit have been downloaded to the second storage unit, and the download unit sets the first look-up table, the second look-up table and the third look-up table to download the predetermined program from the first storage unit to continuous addresses of the second storage unit.

10. The method of claim 2, further comprising:
    arbitrating commands for the first storage unit generated from step (b) and step (c); and
    arbitrating commands for the second storage unit generated from step (b) and step (c).

11. The method of claim 10, wherein the step of arbitrating commands for the first storage unit is performed by buffering commands generated from step (b) and step (c), and the step of arbitrating commands for the second storage unit is performed by buffering commands generated from step (b) and step (c).

12. The method of claim 2, wherein step (c) further comprises caching requested programs from the first storage unit and the second storage unit.

13. The method of claim 2, wherein the predetermined programs are firmware of an optical disc drive.

14. The processing system of claim 3, wherein the non-volatile memory is a FLASH memory.

15. The processing system of claim 4, wherein the volatile memory is a DRAM or an SRAM.

16. The processing system of claim 5, wherein each of the first arbitration unit and the second arbitration unit is a buffer for buffering commands from the download unit and the execution unit.

17. The method of claim 2, wherein the first storage unit includes a plurality of storage areas, and step (b) further comprises:
- providing a first look-up table and setting the first look-up table for determining which storage areas in the first storage unit are to be downloaded to the second storage unit;
- providing a second look-up table and setting the second look-up table for assigning addresses of the second storage unit to storage areas of the first storage unit to be downloaded to the second storage unit;
- providing a third look-up table and setting the third look-up table for determining which storage areas of the first storage unit have been downloaded to the second storage unit; and
- referencing the first look-up table, the second look-up table and the third look-up table to download the predetermined program from the first storage unit to continuous addresses of the second storage unit.

* * * * *